United States Patent
Tesoro

[11] 3,718,675
[45] Feb. 27, 1973

[54] CARBONIC CARBOXYLIC ANHYDRIDES

[75] Inventor: Giuliana C. Tesoro, Dobbs Ferry, N.Y.

[73] Assignee: J. P. Stevens & Co., Inc., Garfield, N.J.

[22] Filed: June 18, 1970

[21] Appl. No.: 57,887

Related U.S. Application Data

[62] Division of Ser. No. 653,632, July 17, 1967, Pat. No. 3,575,960.

[52] U.S. Cl..............260/408, 260/484 R, 260/413, 260/535 H, 260/463
[51] Int. Cl. ....C07c 69/00, C07c 53/28, C07c 53/34
[58] Field of Search..............................260/463, 408

[56] References Cited

UNITED STATES PATENTS 3,231,590  1/1966  Hirano...........................260/404.5

Primary Examiner—Lewis Gotts
Assistant Examiner—Diana G. Rivers
Attorney—Kenyon & Kenyon Reilly Carr & Chapin and J. Bradley Cohn

[57] ABSTRACT

A process for esterification of cellulose wherein a cellulosic material is reacted under mild conditions and in the absence of a catalyst with mixed carbonic carboxylic anhydrides having the characteristic group

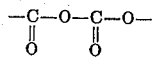

whereby a monovalent or divalent carbon acyl group is bonded to the cellulose by replacing active hydrogen, with consequent ester formation, and there is released as by-products an alcohol or glycol and carbon dioxide.

In addition, novel compounds of the carbonic carboxylic anhydride class which are useful in the formation of cellulose esters according to the above-mentioned process, and which are characterized by the formula

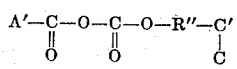

wherein A' is polyfluoroalkyl or polyfluoroalkoxyalkyl, R" is a lower alkylene group, and G' is selected from the group consisting of hydrogen and

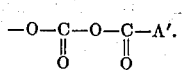

2 Claims, No Drawings

CARBONIC CARBOXYLIC ANHYDRIDES

This application is a division of application Ser. No. 653,632 filed July 17, 1967 now U.S. Pat. No. 3,575,960.

The present invention relates to a process which modifies cellulose or other hydroxyl-containing polymers by replacing the active hydrogen atoms of the hydroxyl groups with a divalent or monovalent carbon acyl radical. It relates as well to certain compounds useful in such process.

More particularly, the present invention relates to such a process as referred to above wherein the hydroxyl-containing polymer is subjected to esterification by one or more mixed carbonic carboxylic anhydrides.

The varied esters of cellulose are widely recognized to be valuable compounds, especially in the manufacture of textiles and films. Prior methods for esterification of cellulose generally require reaction conditions which tend to damage the substrate material or to lead to undesirable by-products, such as acid. It is a primary object of the present invention, therefore, to provide a process for esterifying hydroxylated polymers such as cellulose which can be carried out under mild conditions and without creation of undesirable by-products.

More particularly, it is an object of the present invention to provide a process for the esterification of an hydroxylated polymer which is efficient, and which will readily take place under relatively mild, neutral conditions, without a catalyst, and without formation of acidic by-products.

It is a further object of the present invention to provide a process for esterifying high molecular weight polyols which minimizes depolymerization, degradation and hydrolytic cleavage as much as possible.

It is another object of the present invention to provide a process for increasing the wet and dry crease recovery properties of a cellulosic fabric which has been esterified through a difunctional carbonic carboxylic anhydride.

Generally speaking, the present invention involves a process wherein a high molecular weight polyol, principally a cellulosic material, is esterified by treating it with a carbonic carboxylic anhydride compound having the generic formula

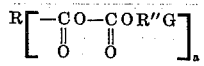

wherein R is an organic radical of from one to about 20 carbon atoms selected from the group consisting of (1) monovalent radicals selected from the class consisting of alkyl, branched alkyl, alkenyl, branched alkenyl, aralkyl, aryl, alkoxyalkyl and fluorinated counterparts of the foregoing monovalent radicals, and (2) the divalent radicals selected from the class consisting of alkylene, alkenylene, aralkenylene and arylene;

a is the integer 1 when R is selected as a monovalent radical and is the integer 2 when R is selected as a divalent radical;

G is hydrogen when R is selected as a divalent radical, and is a member selected from the group consisting of hydrogen and

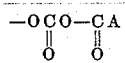

where A is an organic radical of from one to about 20 carbon atoms selected from the group consisting of alkyl, branched alkyl, alkenyl, branched alkenyl, aralkyl, aryl, alkoxyalkyl and fluorinated counterparts of the foregoing radicals, when R is selected as a monovalent radical;

R″ is an alkylene radical of from one to about 12 carbon atoms, and thereafter subjecting the treated polyol to mild reaction conditions until active hydrogen on said polyol is replaced by carbon acyl radicals.

Necessarily the carbon acyl radicals which replace the active hydrogen in the cellulosic material may be either of the formula

when R is monovalent or of the formula

when R is divalent.

In either case, it is seen that inasmuch as the carbon acyl radicals are bonded to the carbon backbone of the polymer through the oxygen atom of the hydroxyl group, the result is an esterification of the polymer.

The net effect of the process in generalized form is shown by the following exemplary chemical equation, wherein an active site of an hydroxyl-containing polymer is denoted by H—OPol, and the simplest type of carbonic carboxylic anhydride is used (R' being lower alkyl and representing R″G, when G is hydrogen).

From the simple equation (A) above it is seen that the by-products of the acylation or esterifying step are a lower alcohol and gaseous carbon dioxide, both of which are non-noxious are readily disposable.

Esters of cellulose have been widely used and studied and have assumed an importance in industry and commerce. In these compounds the selection of the organic radical that enters the cellulose has been largely a matter of choice depending entirely upon the type of ester which is desired. The present invention readily adapts itself to this broad selection of the organic radical R, thereby permitting an extensive range of desired products. Consequently, equation (A) above is merely representative of reactions according to the present invention, and more complex carbonic carboxylic anhydrides within the generic formula may be used to esterify the hydroxyl-containing polymer in like manner. For purposes of clarity and for isolation of particularly unique features associated with the use of certain of the carbonic carboxylic anhydrides in the present invention the class of such compounds represented by the generic formula given above may be broken down into three sub-generic groups, which are hereinafter designated Series I, II and III as follows:

Series I (R is monovalent, a is 1, G is H, and R″H is abbreviated below as R', a lower alkyl):

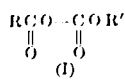

Series II (R is monovalent, $a$ is 1, G is $$-O\underset{\underset{O}{\|}}{C}O-\underset{\underset{O}{\|}}{C}A,$$

and to simplify illustration here, A will be considered to be identical with R):

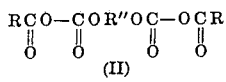

Series III (R is divalent, $a$ is 2, G is H, and R', a lower alkyl, stands for R''H):

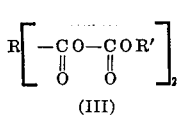

Many of the carboxylic carboxylic anhydrides used in the process of this invention are obtainable by known methods. Generally they can be prepared by a condensation reaction between a carboxylic acid and a suitable chloroformate, the by-product hydrogen chloride immediately being neutralized in situ by an acid acceptor. As used herein and in the claims, the general terms carboxylic acid and alkyl chloroformate are understood to include dicarboxylic acids and alkylene bis(chloroformates), respectively. Methods of preparation of carbonic carboxylic anhydrides of Series I, II and III are exemplified by the following Reactions B, C and D, respectively.

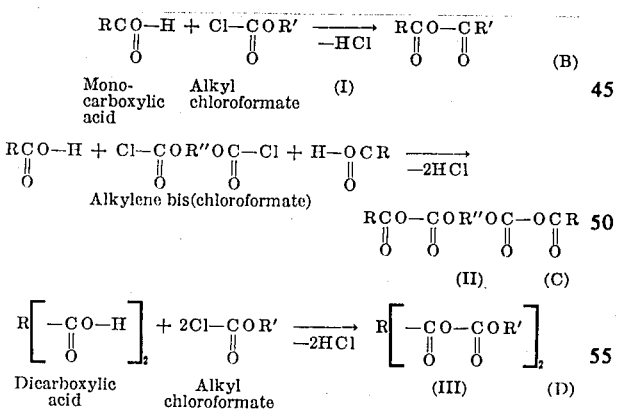

Considering the foregoing reactions, it is apparent that any of several series of carbonic carboxylic anhydrides may be used in the process of this invention, e.g., Series I from a monocarboxylic acid and an alkyl chloroformate,
Series II from a bis(chloroformate) and 2 molar parts of a monocarboxylic acid, and
Series III from a dicarboxylic acid and 2 molar parts of an alkyl chloroformate.

In the Table 1, 2 and 3 below there are shown the formulas and names of several typical carbonic carboxylic anhydrides which are useful in the present invention, and which for convenience sake have been divided into the classifications of Series I, II and III, respectively:

TABLE 1

Series I: $R\underset{\underset{O}{\|}}{C}-O-\underset{\underset{O}{\|}}{C}OR'$, where R' is ethyl

| R | Name of Anhydride |
|---|---|
| $CH_3-$ | Acetic Ethylcarbonic |
| $CH_2=CH-$ | Acrylic Ethylcarbonic |
| $C_{11}H_{23}-$ | Ethylcarbonic Lauric |
| $C_{17}H_{35}-$ | Ethylcarbonic Stearic |
| $C_6H_5$ | Benzoic Ethylcarbonic |
| $C_3H_7\underset{\underset{CH_3}{\|}}{\overset{\overset{CH_3}{\|}}{C}}-$ | Ethylcarbonic Neoheptanoic |
| $C_9H_{19}\underset{\underset{CH_3}{\|}}{\overset{\overset{CH_3}{\|}}{C}}-$ | Ethylcarbonic Neotridecanoic |
| $(F_3C-)_2\underset{\underset{F}{\|}}{C}-O-(CH_2)_{10}-$ | Ethylcarbonic 11-[Florobis(trifluoromethyl)methoxy]undecanoic |
| $CH_3(CH_2)_3-[-\underset{\underset{C_6H_5}{\|}}{C}H-CH_2-]_n-$ | Ethylcarbonic (polystyrene) carboxylic | where $n$ is an integer

TABLE 2

Series II: $R\underset{\underset{O}{\|}}{C}-O-\underset{\underset{O}{\|}}{C}-O-R''-O-\underset{\underset{O}{\|}}{C}-O-\underset{\underset{O}{\|}}{C}R$, where R'' is $-CH_2CH_2-$

| R | Name of Anhydride |
|---|---|
| $CH_2=CH-$ | Ethylenebis(carbonic Acrylic) |
| $C_3H_7\underset{\underset{CH_3}{\|}}{\overset{\overset{CH_3}{\|}}{C}}-$ | Ethylenebis(carbonic Neoheptanoic) |
| $(F_3C-)_2CH-O-CH_2-$ | Ethylenebis{carbonic [bis(Trifluoromethyl)methoxy]acetic} |
| $H(F_2C-)_6CH_2OCH_2CH_2-$ | Ethylenebis[carbonic 3-(1H,1H,7H-Dodecafluoroheptyloxy)propionic] |

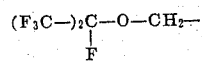 Ethylenebis{carbonic[Fluorobis(trifluoromethyl)methoxy]acetic}

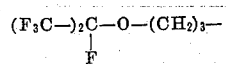 Ethylenebis{carbonic 4-[Fluorobis(trifluoromethyl)methoxy]butyric}

TABLE 3

Series III: $R'OCOC-R-C-O-COR'$, where R is ethyl
$$R'O\underset{O}{\underset{\|}{C}}O\underset{O}{\underset{\|}{C}}-R-\underset{O}{\underset{\|}{C}}-O-\underset{O}{\underset{\|}{C}}OR'$$

| Divalent R | Name of Anhydride |
|---|---|
| —(—CH$_2$—)$_6$— | Suberic Bis (ethylcarbonic) |
| —(—CH$_2$—)$_4$— | Adipic Bis (ethylcarbonic) |
| —(—CH$_2$—)$_8$— | Sebacic Bis (ethylcarbonic) |

Although many of the above compounds are old in the art and their methods of preparation are well known to those skilled in the art, certain of such compounds, especially in Series I and II, are in themselves novel and form a part of the present invention. These novel carbonic carboxylic anhydride compounds may be defined by the following generic formula:

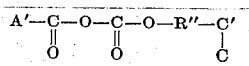

wherein A' is selected from the group consisting of polyfluoroalkyl and polyfluoroalkoxyalkyl, R'' is a lower alkylene of up to 20 carbon atoms, and G' is selected from the group consisting of hydrogen and

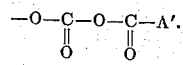

Examples of suitable compounds of the novel class defined above are Ethylenebis[carbonic 3-(1H,1H,7H-Dodecafluoroheptyloxy)propionic anhydride], Ethylenebis {carbonic [bis(trifluoro-methyl)methoxy]acetic anhydride}, Ethylenebis {carbonic[fluorobis-(trifluoromethyl)methoxy]acetic Anhydride}, Ethylcarbonic 11-[fluorobis(trifluoromethyl)methoxy]undecanoic Anhydride, and Ethylenebis {carbonic 4-[fluorobis(trifluoromethyl)methoxy]butyric Anhydride}. The preparation of the above-mentioned compounds is described with particularity in Examples 1, 2, 3, 9 and 10, respectively.

Since it is known to be difficult to prepare mixed carbonic carboxylic anhydrides from strong acids in that such anhydrides generally lack stability and tend to decompose, it was a surprising and unexpected discovery to find that these anhydrides of fluorinated acids, as defined above, can be prepared, isolated, and effectively used for the esterification of polyhydroxylated polymers.

In general, the carbonic carboxylic anhydrides having fluorinated groups may be prepared by the condensation reaction of a polyfluoroalkanoic acid with a diol bis(chloroformate) or alkyl chloroformate. One or more of the ingredients is usually diluted in a solvent, such as ethyl ether, and thereafter reacted in the presence of a weak base, such as triethylamine. The reaction proceeds below room temperature and it is preferably maintained at about 0° C. or below. Further particulars will be evident by reference to the examples.

The esters which have been created by the use of the novel polyfluoro compounds defined above can be useful in the preparation of textiles of improved stain resistance and water repellency.

When practicing the process of the present invention it is generally preferred that an anhydride be selected that is relatively high-boiling. For example, in esterifying a cellulosic fabric with a carbonic carboxylic anhydride, a relatively simple technique of a one-step pad-cure may be used if the anhydride is relatively high-boiling. Esterification agents which meet this criteria and which are particularly suited to this technique are those which have been prepared from a compound that has two chloroformyloxy groups, e.g.,

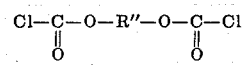

Ethylene glycol bis(chloroformate), i.e., R'' is —CH$_2$CH$_2$—, is representative of such a starting material. It has been found that such a compound can be used, for example, to prepare all of the individual esterifying agents listed in Table 2. The resulting agents are all high-boiling and suited to the simple pad-cure treatment which may be used according to the invention. The method of using a diol bis(chloroformate) as a means for preparing high-boiling esterification agents which are particularly suited to the purposes of the present invention constitutes part of the present invention, and Examples 1-5 and 10 are exemplary of it.

Most of the compounds of Series II and III are relatively high-boiling, including all of those set forth in Tables 2 and 3; however, certain compounds within the generic formula may be relatively low-boiling, especially those in the sub-genus Series I. If it is found by experience that the particular compound being used is not sufficiently high-boiling to be readily applied by pad-cure techniques, then a wet reaction or immersion technique can be used on cellulosic substrate. The use of such techniques is also set forth in the examples, e.g., Example 11.

Particularly effective results are achieved when a hydroxyl-containing polymer is treated by a carbonic carboxylic anhydride, such as those defined by the sub-generic Series III, which is capable of forming crosslinks with the polymer. The reaction as it applies to cellulose, for example, can be represented as follows:

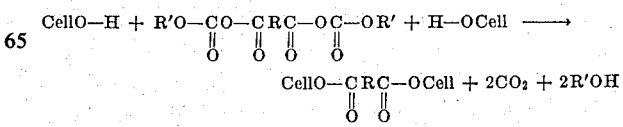

The net effect is that cellulose is cross-linked by esterification with a dicarboxylic acid, such as suberic acid, adipic acid or sebacic acid. The application of this principle is that it provides an improved means for imparting crease recovery (both wet crease recovery and dry crease recovery) to cellulosic fabrics. Because no acidic catalyst is required, and because the reaction is effected under relatively mild, neutral conditions, this process permits cellulosic fabric to be modified for durable creases and pleats without significant weakening of the strength of the textile. The efficiency of the cellulose reaction with the carbonic carboxylic anhydrides prepared from dibasic acids is quite high, and in most cases approaches 100 percent.

Similarly, carbonic carboxylic anhydrides that have a residual vinyl group after reaction with the cellulose may undergo further addition or cross-linking through the vinyl group. For example, acrylic ethylcarbonic anhydride (See Table 1) has an active vinyl group, and is useful for making acrylic esters of hydroxyl-containing polymers. Such esters can be cross-linked through addition polymerization, as the following equation denotes:

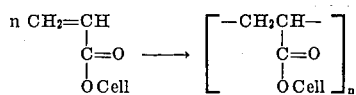

(where $n$ represents the degree of polymerization).

Although one of the outstanding advantages of the present invention is that mild conditions may be used which will not degradate the substrate or polymer structure, the esterification reaction itself may be carried out over a very wide range of conditions.

Thus, the esterification may take from a few minutes to several hours, depending upon the other conditions chosen, particularly temperature. High temperatures require less time within which to effect esterification, and vice versa. In general, however, a suitable reaction may be obtained by using temperatures in the range of about 10° C. to 200° C. or even higher, and by using times in the range of about 24 hours to 5 minutes or less. Obviously the permissible range of reaction conditions is quite extensive, and the optimum conditions for any particular reaction involving a selected polymeric substrate and a selected carbonic carboxylic anhydride can be arrived at quickly in an empirical manner.

The carbonic carboxylic anhydride is preferably used while diluted in an appropriate solvent. Suitable solvents are those which are polar and hence swell the cellulosic substrate. A preferred polar solvent is N,N-dimethylformamide. Other suitable illustrative solvents are N,N-dimethylacetamide, 1-methyl-2-pyrrolidinone, 1,5-dimethyl-1-2-pyrrolidinone, dimethyl sulfoxide and tetramethylene sulfone.

Having thus described the general process, hereinbelow are set forth several specific examples further illustrating the use of the process of the present invention and the advantages that can be derived from it. Examples 1–10 describe methods by which one may prepare novel carbonic carboxylic anhydrides which are useful in the present invention, and Examples 11–28 describe specific embodiments of the process and compounds of the present invention.

EXAMPLE 1

Preparation of Ethylenebis [carbonic 3-(1H,1H,7H-Dodecafluoroheptyloxy) Propionic Anhydride]

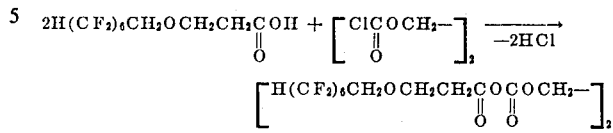

3-(1H,1H,7H-Dodecafluoroheptyloxy)propionic acid (40.4 grams, 0.1 mole) was dissolved in 200 ml. of ethyl ether. The solution was cooled at 0° C. and triethylamine (10.1 grams, 0.1 mole) was added. At 0° C. ethylene glycol bis(chloroformate) (9.35 grams, 0.05 mole) was added in 15 minutes with stirring. Upon completion of the addition, the mixture was stirred for another 30 minutes and allowed to warm to room temperature. The mixture was filtered to remove triethylammonium chloride, and the filtrate was washed with 50 ml. of a saturated solution of sodium bicarbonate, then by 50 ml. of water, and finally dried with sodium sulfate. Ethyl ether was distilled off in vacuo at 30° C. leaving 39 grams (an 85 percent yield) of ethylenebis[carbonic 3-(1H,1H,7H-dodecafluoroheptyloxy)propionic anhydride].

EXAMPLE 2

Preparation of Ethylenebis (carbonic[Bis(trifluoromethyl) methoxy]Acetic Anhydride)

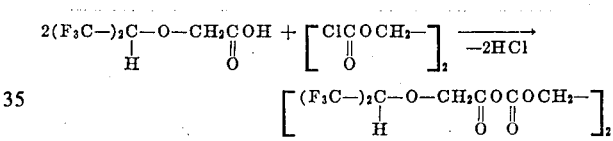

[Bis(trifluoromethyl)methoxy]acetic acid (81.4 grams, 0.36 mole), ethylene glycol bis(chloroformate) (33.7 grams, 0.18 mole), and triethylamine (36.4 grams, 0.36 mole) were allowed to react, the procedure being similar to that of Example 1. The yield of ethylenebis[carbonic(bis(trifluoromethyl)methoxy)acetic anhydride] was 78 grams (77 percent of the theoretical maximum amount.)

EXAMPLE 3

Preparation of Ethylenebis (carbonic[Fluorobis(trifluoro-methyl)methoxy]Acetic Anhydride)

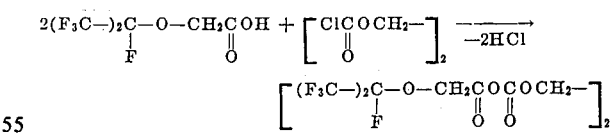

[Fluorobis(trifluoromethyl)methoxy]acetic acid (122 grams, 0.5 mole), ethylene glycol bis(chloroformate) (46.75 grams, 0.25 mole), and triethylamine (50.5 grams, 0.5 mole) were allowed to react, the procedure being similar to that of Example 1. The yield of ethylenebis [carbonic[fluorobis(trifluoromethyl)-methoxy]acetic anhydride] was 129 grams (86%).

EXAMPLE 4

Preparation of Ethylenebis (carbonic Acrylic Anhydride)

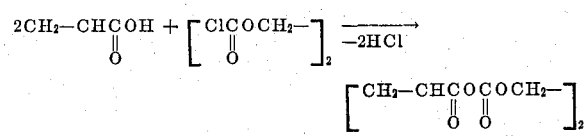

Acrylic acid, ethylene glycol bis(chloroformate) and triethylamine in the molar proportion of 2, 1 and 2 were allowed to react, the procedure being similar to that of Example 1. The yield of ethylenebis(carbonic acrylic anhydride) was 40 percent of the theoretical amount.

EXAMPLE 5

Preparation of Ethylenebis (carbonic Neoheptanoic Anhydride)

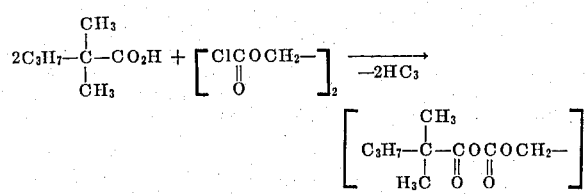

Neoheptanoic acid, ethylene glycol bis(chloroformate), and triethanolamine in the molar proportion of 2, 1 and 2 were allowed to react, the procedure being similar to that of Example 1. The yield of ethylenebis(carbonic neoheptanoic anhydride) was 86%.

EXAMPLE 6

Preparation of Ethylcarbonic Neoheptanoic Anhydride

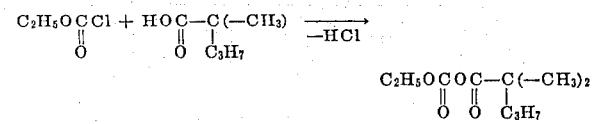

Neoheptanoic acid, ethyl chloroformate, and triethanolamine in equimolar proportion were allowed to react, the procedure otherwise being similar to that of Example 1. The yield of ethylcarbonic neoheptanoic anhydride was 90%.

EXAMPLE 7

Preparation of Ethylcarbonic Neotridecanoic Anhydride

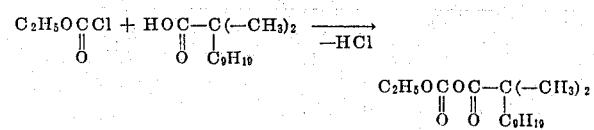

Neotridecanoic acid, ethyl chloroformate, and triethanolamine in equimolar proportion were allowed to react, the procedure otherwise being similar to that of Example 1. The yield of ethylcarbonic neotridecanoic anhydride was 78 percent.

EXAMPLE 8

Preparation of Ethylcarbonic (Polystyrene)carboxylic Anhydride

First, (polystyrene)carboxylic acid was prepared by the following series of reactions in which the degree of polymerization is denoted by n, and Bu stands for $CH_3CH_2CHCH_2—$.

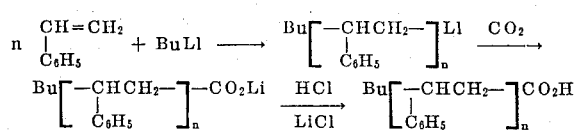

The solution composed of 112.5 ml. (0.975 mole) of styrene, 1500 ml. of dry benzene, and 10 ml. of tetrahydrofuran was added (under nitrogen) to a solution of 24 grams (0.39 mole) of butyllithium in 700 ml. of dry petroleum ether. The addition required 5 minutes. The reaction solution, which became dark red, was poured into a flask containing a large excess of crushed, solid carbon dioxide. The reaction mixture was allowed to warm to room temperature at which time an excess of gaseous hydrogen chloride was bubbled into the mixture during a period of 1 hour. By-product lithium chloride was filtered off. The filtrate was concentrated considerably by evaporation. The desired product was precipitated by the addition of methanol at $-20°$ C., collected on a filter, and dried. The yield of carboxyl-terminated polystyrene was 100 grams. The equivalent weight of (polystyrene)carboxylic acid was found to be 1810 by titration with standard base. Hence, the average degree of polymerization, n, was between 16 and 17.

Next, the carboxyl-terminated polystyrene was converted to ethylcarbonic (polystyrene)carboxylic anhydride in accordance with the following reaction.

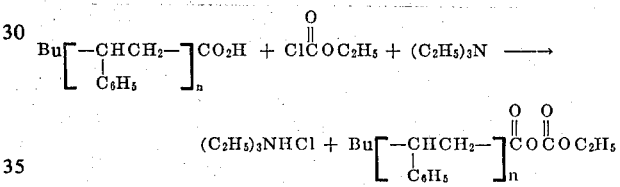

The carboxyl-terminated polystyrene (90.5 grams, 0.05 mole) and 5.05 grams (0.05 mole) of triethylamine were dissolved in 1 liter of ethyl ether. The solution was cooled to 0° C. To it was added 5.43 grams (0.05 mole) of ethyl chloroformate dropwise in 15 minutes, while the reaction temperature was kept at 0° C. The reaction solution was allowed to stand for 2 hours and warm to room temperature. Triethylammonium chloride was filtered off. The filtrate was evaporated to dryness, resulting in a yield of 87 grams of ethylcarbonic (polystyrene)carboxylic anhydride.

EXAMPLE 9

Preparation of Ethylcarbonic 11-(fluorobis(trifluoromethyl)-methoxy]undecanoic Anhydride First, 11-[fluorobis(trifluoromethyl)methoxy]undecanoic acid was prepared by the following reaction.

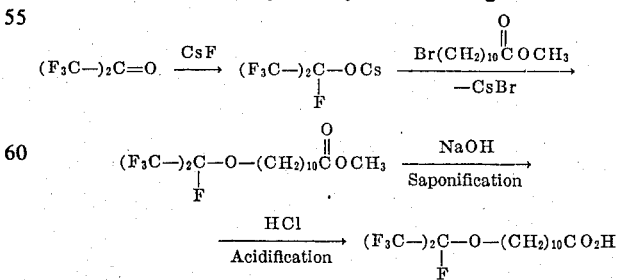

During a 30 minute period, a total of 260 grams (1.56 moles) of hexafluoroacetone was bubbled into a mixture of 239 grams (1.56 moles) of cesium fluoride in 700 ml. of dry bis-(2-methoxyethyl) ether at −40° C. Then the mixture was allowed to warm to room temperature, and methyl 11-bromoundecanoate (340 grams, 0.90 mole) was added promptly. The mixture was stirred at 75° C. for 48 hours. Next, the solid matter (mainly cesium bromide) was filtered off. The filtrate was washed by two separate 2-liter portions of water. Ethyl ether was added to the organic layer, which was dried over anhydrous magnesium sulfate. After removal of ethyl ether by distillation, methyl 11-[fluorobis-(trifluoromethyl)methoxy]undecanoate (300 grams) was collected mainly at 80° to 85° C. during distillation at approximately 0.1 torr. Saponification was effected by allowing the following mixture to remain for 2 hours at room temperature: 285 grams (0.74 mole) of the ester in 1 liter of ethanol (denatured by 5 percent of its volume of methanol), and 60 grams (1.5 moles) of sodium hydroxide dissolved in 60 ml. of water. Then the mixture was poured into 2 liters of water, and acidified with concentrated hydrochloric acid to pH 3. The oily layer was separated, dissolved in ethyl ether, and washed with water until practically neutral. The organic solution was dried over anhydrous magnesium sulfate. The solvent was volatilized off, leaving 279 grams of 11-[fluorobis(trifluoromethyl)methoxy]undecanoic acid.

Next, the heptafluoro ether-acid was converted to ethylcarbonic 11-[fluorobis(trifluoromethyl)methoxy]undecanoic anhydride by means of the following reaction.

$$(F_3C-)_2C-O-(CH_2)_{10}CO_2H + ClCOC_2H_5 + (C_2H_5)_3N \longrightarrow$$
$$\underset{F}{|} \qquad \qquad \underset{O}{\|}$$

$$(C_2H_5)_3NHCl + (F_3C-)_2C-O-(CH_2)_{10}COCOC_2H$$
$$\underset{F}{|} \qquad \qquad \underset{O}{\|}\underset{O}{\|}$$

A solution consisting of 219 grams (0.59 mole) of the heptafluoro ether-acid and 59.7 grams (0.59 mole) of triethylamine in 1 liter of ethyl ether was cooled to 0° C. During a 15 minute period a total of 64.3 grams (0.59 mole) of ethyl chloroformate was added dropwise at 0° C. Then the mixture was stirred for 1 hour and was allowed to warm to room temperature. Triethylammonium chloride was filtered off. The filtrate was washed with a saturated solution of sodium bicarbonate, next with water, and then dried over anhydrous sodium sulfate. After the solvent had been evaporated, the resulting yield of ethylcarbonic 11-[fluorobis-(trifluoromethyl)methoxy]undecanoic anhydride was 234 grams.

EXAMPLE 10

Preparation of Ethylenebis [carbonic 4-[Fluorobis(tri-fluoromethyl)methoxy] butyric Anhydride First, 4-[fluorobis(trifluoromethyl)methoxy]butyric acid was prepared by the following reaction.

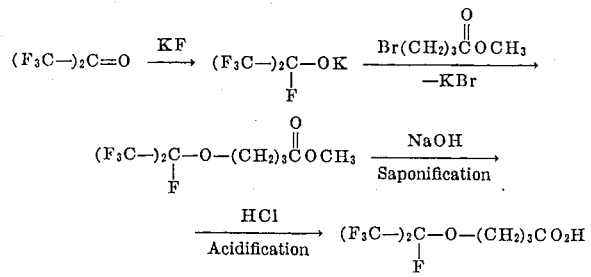

A total of 350 grams (2.1 moles) of hexafluoroacetone was bubbled into a mixture of 123 grams (2.1 moles) of potassium fluoride in 800 ml. of dry bis(2-methoxyethyl) ether at −40° C. Then the mixture was allowed to warm to room temperature and methyl 4-bromobutyrate (380 grams, 2.1 moles) was added promptly. The mixture was stirred at 75° C. for 16 hours. After that, it was poured into 2 liters of water. The organic layer was dissolved in ethyl ether and dried over anhydrous magnesium sulfate. After removal of ethyl ether by distillation, methyl 4-[fluorobis-(trifluoromethyl)methoxy]256 grams) was collected mainly at 85° C. during distillation at approximately 10 torrs. Saponification was effected by stirring the following mixture for 1.5 hours at room temperature: 256 grams (0.895 mole) of the ester in 2 liters of methanol, and 72 grams (1.8 moles) of sodium hydroxide dissolved in 72 grams of water. Then the mixture was poured into 4 liters of water, and acidified with concentrated hydrochloric acid to pH 3. The oily product was dissolved in ethyl ether, and washed with water until practically neutral. The organic solution was dried over anhydrous magnesium sulfate. The solvent was volatilized off, and a total of 195 grams (0.717 mole) of 4-[fluorobis(trifluoromethyl)methoxy]butyric acid was collected at 90° C. during distillation at 2 torrs.

Next, the heptafluoro ether-acid was converted to ethylenebis[carbonic 4-[fluorobis(trifluoromethyl)methoxy]butyric anhydride] by means of the following reaction.

$$2(F_3C-)_2C-O(CH_2)_3CO_2H + \left[\underset{\underset{O}{\|}}{ClCOCH_2-}\right]_2 + 2(C_2H_5)_3N \longrightarrow$$
$$\underset{F}{|}$$

$$2(C_2H_5)_3NHCl + \left[(F_3C-)_2C-O(CH_2)_3COCOCH_2-\right]_2$$
$$\qquad \underset{F}{|} \qquad \underset{O}{\|}\underset{O}{\|}$$

A solution consisting of 185 grams (0.68 mole) of the heptafluoro ether-acid and 68.7 grams (0.68 mole) of triethylamine in 1.5 liters of ethyl ether was cooled to 0° C. During a 15 minute period a total of 65.5 grams (0.35 mole) of ethylene glycol bis(chloroformate) was added dropwise at 0° C. Then the mixture was stirred for 1 hour and was allowed to warm to room temperature. Triethylammonium chloride was filtered off. The filtrate was washed with a saturated solution of sodium bicarbonate, next with water, and then dried over anhydrous sodium sulfate. After the solvent had been evaporated, the resulting yield of ethylene-bis[carbonic 4-[fluorobis(trifluoromethyl)methoxy]butyric anhydride] was 200 grams.

Having thus set forth exemplary procedures for the preparation of carbonic carboxylic anhydrides, there is shown in the examples below how such carbonic carboxylic anhydride compounds, as well as others, can be used according to the invention to esterify cellulosic materials.

The tests which are used in the examples to show the relative physical changes which have occurred by reason of the esterification reactions, and the units and legends used therein, are as follows:

Crease Recovery angle, in degrees, total of readings in filling (F) and warp (W); Monsanto Method, ASTM D-1295-60T.

Stiffness (Cantilever), in milligrams per centimeter; ASTM D-1388-55T.

Tear Strength, in pounds in warp (W) direction, Elmendorf Method, ASTM D-1424-59.

Tensile Strength, in pounds in warp (W) direction, ravel 1 inch strip method; Federal Specifications for Textile Test Methods, CCC-T-1916, Method 5104.1.

The conditioning of samples for testing purposes was at 21 ±1°C. and a relative humidity of 65 ±2%. In the tables presenting data all parts and percentages are by weight unless otherwise noted.

The following legends have been used;

OWB: On the weight of the bath used for padding, in per cent.

OWF: On the weight of the fiber (or fabric), i.e., the percentage based on the weight of the fabric prior to padding. OWB times WPU/100% = OWF.

WPU: Wet pickup, i.e., the percentage of wet add-on OWF, measured directly after padding.

Moisture Regain (in %) is the weight of moisture calculated as a percentage of the bone-dry weight, ASTM D-629-59T.

Extent of Utilization of Padded Reagent (%) is the efficiency of reaction, calculated as $f$ (100%) E/(% OWF) $c$ where $f$ is the found or observed weight gain, $e$ is the equivalent weight of the residue of atoms acylating the cellulose, E is the equivalent weight of the carbonic carboxylic anhydride, and OWF is defined as above.

EXAMPLE 11

The following reaction was carried out to make an acetylated cellulose:

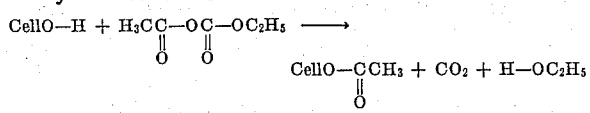

Two samples of plain weave cotton fabric, commonly known as 80 × 80 print cloth, were conditioned and weighed on an analytical balance. The samples were immersed in a 25 percent solution of acetic ethylcarbonic anhydride in N,N-dimethylformamide for 2 hours (Sample 10a) and 6 hours (Sample 11b), respectively. The temperature of the liquid was maintained at 90° C. in each instance. Upon removal from the solution, each sample was rinsed thoroughly in dimethylformamide and then in water containing 0.1 percent of a nonionic detergent (isooctylphenol bound to an average of 9 or 10 repeating units of polymerized ethylene oxide). After having been dried, the samples were conditioned and weighed. Weight gains for 11a and 11b resulting from acetylation were, respectively, 5.3 and 6.1 percent, corrected for moisture regain. In the warp direction, tensile strengths were respectively 58 and 54 pounds. The tensile strength of untreated 80 × 80 print cloth was 59 pounds in the warp direction, consequently there was no substantial loss in strength associated with the esterification.

EXAMPLE 12

A sample of 80 × 80 cotton print cloth was conditioned and weighed as in Example 11. Then it was padded with a 20 percent solution of acrylic ethylcarbonic anhydride in dimethylformamide. Rollers on the laboratory padder were set so the resulting wet pick-up was 92 percent. Without drying, the sample was placed in a test tube, which was sealed and kept for 4 hours in a water bath at 90° C. After the treatment, the sample was rinsed, conditioned and weighed as those steps were carried out in Example 11. The weight gain, corrected for moisture regain, was 1.7 percent, indicative that 24 percent of the amount of reagent padded on the fabric had under-gone chemical reaction to form an acrylic ester of cellulose.

EXAMPLE 13

Three samples of 80 × 80 cotton print cloth, designated 13a, 13b and 13c, were conditioned and weighed as in Example 11. Then they were padded with a 20% solution of ethylcarbonic lauric anhydride in dimethylformamide in accordance with percentages shown in the following Table 4. Samples 13b and 13c were cured at 135° C. for various times as indicated in Table 4. After the heat treatments, each sample was rinsed, conditioned and weighed as those steps were described in Example 11. The data obtained, including the physical performance results of the esterified (lauric) cellulose are shown in Table 4.

TABLE 4

| Sample | Ethylcarbonic lauric anhydride, percent, from dimethylformamide | | | Conditions for esterification | Corrected weight gain, percent | Extent utilization of padded reagent, percent | Crease recovery, degrees | | Tensile strength, lbs. | Tear strength, lbs. |
|---|---|---|---|---|---|---|---|---|---|---|
| | OWB | WPU | OWF | | | | Dry | Wet | | |
| 13a | 20 | 84 | 16.8 | 4 hrs. at 90° C | 1.1 | 9 | | | | |
| 13b | 20 | 90 | 18.0 | 0.25 hr. at 135° C | 6.9 | 58 | 226 | 196 | 52 | 1.6 |
| 13c | 20 | 88 | 17.6 | 0.5 hr. at 135° C | 7.2 | 66 | 214 | 205 | 56 | 1.5 |
| Control [1] | Untreated | | | | | | 193 | 162 | 59 | 1.7 |

[1] Average results on 5 specimens.

Greater yields were obtained for the treatments at 135° C. than for that at 90° C. Despite the fact that the extents of the utilization of the reagent padded on the fabric were appreciable (58 and 66 percent), mechanical strength values were not greatly impaired as compared with the untreated control specimens. On the other hand, crease recovery was significantly improved in comparison with the untreated (control) specimens.

EXAMPLE 14

Three samples of 80 × 80 cotton print cloth, 14a, 14b and 14c, were conditioned and weighed as in Example 11. Then they were padded with a 20 percent solution of ethylcarbonic stearic anhydride in dimethylformamide in accordance with percentages shown in the following Table 5. Sample 14a was kept wet in a sealed test tube at 90° C. for 4 hours. The other samples were cured at 135° C. for various times as indicated in Table 5. After the various heat treatments, each sample was rinsed, conditioned and weighed as those steps were described in Example 11. The treatments formed stearic esters of cellulose, and the remaining pertinent data, including the results of evaluation of performance, are shown in Table 5.

It is seen that the esterified cellulose showed significantly improved crease recovery with no significant loss in tear strength. Moreover, the esterified cellulose was characterized by a softer hand, as may be seen by the reduced stiffness.

TABLE 5

| Sample | Ethylcarbonic stearic anhydride, percent, from dimethylformamide | | | Conditions for esterification | Corrected weight gain, percent | Extent utilization of padded reagent, percent | Crease recovery, degrees | | Tear strength, lbs. | Stiffness mg./cm. |
|---|---|---|---|---|---|---|---|---|---|---|
| | OWB | WPU | OWF | | | | Dry | Wet | | |
| 14a | 20 | 73 | 14.6 | 4 hrs. at 90° C | 1.1 | 10 | | | | |
| 14b | 20 | 72 | 14.4 | 0.25 hr. at 135° C | 7.4 | 75 | 228 | 196 | 1.9 | 75 |
| 14c | 20 | 72 | 14.4 | 0.5 hr. at 135° C | 7.4 | 75 | 214 | 205 | 1.4 | 75 |
| Control [1] | Untreated | | | | | | 193 | 162 | 1.7 | 105 |

[1] Average results on 5 specimens.

EXAMPLE 15

Three samples of 80 x 80 cotton print cloth, 15a, 15b and 15c, were conditioned and weighed as in Example 11. Then they were padded with a 20 percent solution of benzoic ethylcarbonic anhydride in dimethylformamide in accordance with percentages shown in the following Table 6. Sample 15a was kept wet in a sealed test tube at 90° C. for 4 hours. The other samples were cured at 135° C. for various times as indicated in Table 6. After the various heat treatments, each sample was rinsed, conditioned and weighed as those steps were described in Example 11.

The process resulted in the formation of benzoic esters of cellulose, the extent of esterification being somewhat higher for the samples treated at 135° C.

TABLE 6

| Sample | benzoic ethylcarbonic anhydride, percent, from dimethylformamide | | | Conditions for esterification | Corrected weight gain, percent | Extent utilization of padded reagent, percent |
|---|---|---|---|---|---|---|
| | OWB | WPU | OWF | | | |
| 15a | 20 | 88 | 17.6 | 4 hrs. at 90° C | 2.6 | 28 |
| 15b | 20 | 94 | 18.8 | 0.25 hr. at 135° C | 5.8 | 57 |
| 15c | 20 | 88 | 17.6 | 0.5 hr. at 135° C | 5.7 | 61 |

EXAMPLE 16

Four samples of 80 X 80 cotton print cloth, 16a, 16b, 16c and 16d, were conditioned and weighed as in Example 11. Three of them, 16a, 16b, 16c, were padded with a solution of ethyl-carbonic neoheptanoic anhydride (the product of Example 6) in dimethylformamide and treated and tested in accordance with the data tabulated below in Table 7. Sample 16a was kept wet in a sealed test tube at 90° C. for 4 hours. Samples 16b and 16c were were cured at 121° C. and 135° C. for 15 minutes, as indicated. Sample 16d was immersed in a 25 percent solution of ethylcarbonic neoheptanoic anhydride in dimethylformamide for 4 hours at 90° C. After the various heat treatments, each sample was rinsed, conditioned, and weighed as those steps were described in Example 11. Extents of esterification to form neopeptanoic esters of the cellulose are shown in Table 7.

TABLE 7

| Sample | Ethylcarbonic neoheptanoic anhydride, percent, from dimethylformamide | | | Conditions for esterification | Corrected weight gain, percent | Extent utilization of padded reagent, percent |
|---|---|---|---|---|---|---|
| | OWB | WPU | OWF | | | |
| 16a | 20 | 90 | 18.0 | 4 hrs. at 90° C | 0.6 | |
| 16b | 20 | 85 | 17.0 | 0.25 hr. at 121° C | 2.3 | 25 |
| 16c | 10 | 81 | 8.1 | 0.25 hr. at 135° C | 1.7 | 37 |
| 16d | 25 | (1) | (1) | 4 hrs. at 90° C | 4.0 | |

[1] Not padded; immersed.

EXAMPLE 17

Three samples of 80 X 80 cotton print cloth, 17a, 17b, and 17c, were conditioned and weighed as in Example 11. Two of them (17a and 17b) were padded with a 20 percent solution of ethylcarbonic neotridecanoic anhydride (the product of Example 7) in dimethylformamide in accordance with data tabulated below in Table 8. Sample 17a was kept wet in a sealed test tube at 90° C. for 4 hours. Sample 17b was cured for 0.25 hour at 135° C. Sample 17c was immersed in a 25 percent solution of ethylcarbonic neotridecanoic anhydride in dimethylformamide for 4 hours at 90° C. After the heat treatment, each sample was rinsed, conditioned and weighed as those steps were described in Example 11. The treatment resulted in formation of neotridecanoic esters of cellulose. Results are given in Table 8 below.

TABLE 8

| Sample | Ethylcarbonic neotridecanoic anhydride, percent in dimethylformamide | | | Conditions for esterification | Corrected weight gain, percent | Extent utilization of padded reagent, percent |
|---|---|---|---|---|---|---|
| | OWB | WPU | OWF | | | |
| 17a | 20 | 67 | 13.4 | 4 hrs. at 90° C | 1.6 | 14 |
| 17b | 20 | 65 | 13.0 | 0.25 hr. at 135° C | 1.7 | 18 |
| 17c | 25 | (1) | (1) | 4 hrs. at 90° C | 1.6 | |

[1] Not padded; immersed.

EXAMPLE 18

Three samples of 80 × 80 cotton print cloth, 18a, 18b and 18c, were conditioned and weighed as in Example 11. Two of them (18a and 18b) were padded with a 25 percent solution of ethylenebis (carbonic acrylic anhydride), the product of Example 4, in dimethylformamide as set forth below in Table 9. Samples 18a and 18b were cured at 135° C. for various times as indicated. Sample 18c was immersed in a 20 percent solution of ethylenebis (carbonic acrylic anhydride) in dimethylformamide for 4 hours at 90° C. After the heat treatment, each sample was rinsed, conditioned and weighed as those steps were described in Example 11.

The treatment resulted in the formation of acrylic esters of cellulose. Physical testing of the padded samples showed improved crease recovery with but slight loss in tensile strength.

Example 2, in dimethylformamide, and cured, all in accordance with data tabulated below in Table 11. The third sample (20c) was immersed in a 20 percent solution of the same anhydride in dimethylformamide for 4 hours at 90° C. After the esterification reaction, each sample was rinsed, conditioned and weighed as those steps were described in Example 11. The results, tabulated below, show formation of [bis(trifluoromethyl)methoxy]acetic esters of cellulose.

TABLE 11

| Sample | Anhydride of Example 2,%, in Dimethylformamide | | | Conditions for Esterification | corrected Weight Gain, % |
|---|---|---|---|---|---|
| | OWB | WPU | OWF | | |
| 20a | 20 | 95 | 19.0 | 0.25 hr. at 135° C. | 0.52 |
| 20b | 20 | 90 | 18.0 | 0.5 hr. at 135° C. | 0.58 |
| 20c | 20 | (Not padded; Immersed) | | | 4 hrs. at 90° C. | 0.39 |

TABLE 9

| Sample | Ethylenebis (carbonic acrylic anhydride), percent, in dimethylformamide | | | Conditions for esterification | Corrected weight gain, percent | Extent utilization of padded reagent, percent | Crease recovery, degrees | | Tensile strength, lbs. |
|---|---|---|---|---|---|---|---|---|---|
| | OWB | WPU | OWF | | | | Wet | Dry | |
| 18a | 25 | 83 | 20.7 | 0.25 hr. at 135° C. | 4.0 | 46 | 230 | 232 | 47 |
| 18b | 25 | 82 | 20.5 | 0.5 hr. at 135° C. | 4.4 | 51 | 233 | 225 | 44 |
| 18c | 20 | (1) | (1) | 4 hrs. at 90° C. | 2.6 | | | | |

[1] Not padded; immersed.

EXAMPLE 19

Two samples of 80 × 80 cotton print cloth, 19a and 19b, were conditioned and weighed as in Example 11. They were padded with a 25 percent solution of ethylenebis (carbonic neoheptanoic anhydride) the product of Example 5, in dimethylformamide and cured in accordance with the data tabulated below in Table 10. After the esterification reaction, each sample was rinsed, conditioned and weighed as those steps were described in Example 11. The results tabulated below in Table 10 show formation of neoheptanoic esters of cellulose, and an improvement in crease recovery without significant loss in tensile strength.

EXAMPLE 21

Four samples of 80 × 80 cotton print cloth, 21a, 21b, 21c and 21d, were conditioned and weighed as in Example 11. Three of them (21a, 21b, 21c) were padded with a 20 percent solution of ethylenebis[carbonic 3-(1H,1H,7H-dodecafluoroheptyloxy)propionic anhydride], the product of Example 1, in dimethylformamide, and cured in accordance with data tabulated below in Table 12. The fourth sample (21d) was immersed in a 20 percent solution of the same anhydride in dimethylformamide for 4 hours at 90° C. After the esterification reaction, each sample was rinsed, conditioned and weighed as in Example 11. The results tabu-

TABLE 10

| Sample | Ethylenebis (carbonic neoheptanoic anhydride), percent, in dimethylformamide | | | Conditions for esterification | Corrected weight gain, percent | Extent utilization padded reagent, percent | Crease recovery, degrees | | Tensile strength, lbs. |
|---|---|---|---|---|---|---|---|---|---|
| | OWB | WPU | OWP | | | | Dry | Wet | |
| 19a | 25 | 83 | 20.7 | 0.25 hr. at 135° C. | 1.0 | 9 | 202 | 207 | 55 |
| 19b | 25 | 79 | 19.7 | 0.5 hr. at 135° C. | 1.1 | 10 | 202 | 205 | 55 |

EXAMPLE 20

Three samples of 80 × 80 cotton print cloth, 20a, 20b and 20c, were conditioned and weighed as in Example 11. Two of them (20a and 20b) were padded with a 20 percent solution of ethylenebis (carbonic[bis(trifluoromethyl)methoxy]acetic anhydride), the product of lated below, show formation of 3-(1H,1H,7H,dodecafluoroheptyloxy)propionic esters of cellulose.

Examination of esterified sample 21b showed a fluorine content of 3.8 percent.

TABLE 12

| Sample | Anhydride of Example 1, percent, in dimethylformamide | | | Conditions for esterification | Corrected weight gain, percent | Extent utilization of padded reagent, percent | Tensile strength, lbs. |
|---|---|---|---|---|---|---|---|
| | OWB | WPU | OWF | | | | |
| 21a | 20 | 104 | 20.8 | 0.25 hr. at 135° C. | 8.14 | 47 | |
| 21b | 20 | 101 | 20.2 | 0.5 hr. at 135° C. | 8.13 | 48 | 56 |
| 21c | 20 | 98 | 19.6 | 0.25 hr. at 163° C. | 7.87 | 48 | |
| 21d | 20 | (1) | (1) | 4 hrs. at 90° C. | 1.0 | | |

[1] Not padded; immersed.

EXAMPLE 22

Two samples of 80 × 80 cotton print cloth, 22a and 22b, were conditioned and weighed as in Example 11. They were padded with a 25 percent solution of suberic bis(ethylcarbonic anhydride) in dimethylformamide and cured under conditions promoting acylation and cross-linking, in accordance with data tabulated below in Table 13. After the esterification reaction, each sample was rinsed, conditioned and weighed as in Example 11. All of the suberoyl part of the carbonic carboxylic anhydride padded on both samples acylated the cellulose, i.e., there was 100 percent utilization of the reagent padded on the fabric, based on weight gains. Results tabulated below show that crease recovery angles were increased markedly above the control values of 193° C. (dry) and 162° C. (wet).

EXAMPLE 24

Two samples of 80 × 80 cotton print cloth, 24a and 24b, were conditioned and weighed as in Example 11. They were padded with a 25 percent solution of sebacic bis(ethylcarbonic anhydride) in dimethylformamide and cured (heat treated) at 135° C. for various times as tabulated below in Table 15. After the reaction, which took place under conditions promoting acylation and cross-linking, each sample was rinsed, conditioned and weighed as in Example 11. Practically all of the sebacoyl part of the carbonic carboxylic anhydride padded on both samples acylated the cellulose, i.e., there was 97–98 percent utilization of the reagent padded on the fabric, based on weight gains. Results tabulated below show high crease recovery angles, even at a high tensile strength relative to the control specimens.

TABLE 13

| Sample | Suberic bis-(ethylcarbonic anhydride), percent, in dimethylformamide | | | Conditions for esterification | Corrected weight gain, percent | Extent utilization of padded reagent, percent | Crease recovery, degrees | | Tensile strength lbs. |
|---|---|---|---|---|---|---|---|---|---|
| | OWB | WPU | OWF | | | | Dry | Wet | |
| 22a | 25 | 91 | 22.7 | 0.25 hr. at 135° C | 13.5 | 100 | 281 | 260 | 36 |
| 22b | 25 | 86 | 21.5 | 0.5 hr. at 135° C | 12.3 | 100 | 288 | 268 | 40 |

TABLE 15

| Sample | Sebacic bis(ethylcarbonic anhydride), percent, in dimethylformamide | | | Conditions for esterification | Corrected weight gain, percent | Extent utilization of padded reagent, percent | Crease recovery, degrees | | Tensile strength, lbs. |
|---|---|---|---|---|---|---|---|---|---|
| | OWB | WPU | OWF | | | | Dry | Wet | |
| 24a | 25 | 79 | 19.7 | 0.25 hr. at 135° C | 9.18 | 97 | 284 | 255 | 38 |
| 24b | 25 | 74 | 18.5 | 0.5 hr. at 135° C | 8.72 | 98 | 289 | 252 | 57 |
| Control [1] | Untreated | | | | | | 193 | 162 | 59 |

[1] Average results on 5 specimens.

EXAMPLE 23

Four samples of 80 × 80 cotton print cloth, 23a, 23b, 23c and 23d, were conditioned and weighed as in Example 11. Two of them (23a and 23b) were kept wet with a 25 percent solution of adipic bis(ethylcarbonic anhydride) in a sealed test tube for various times and temperatures as shown in Table 14 below. The remaining two samples, 23c and 23d, were padded with the 25 percent solution and then were heat treated for the times and temperatures indicated in Table 14. After the reaction period, wherein each sample was subjected to conditions for formation of adipic esters of cellulose, and subsequent cross-linking, each sample was rinsed, conditioned and weighed as in Example 11. The results tabulated below in Table 14 show that good crease recovery angles resulted by the use of this carbonic carboxylic anhydride which provides adipoyl radicals capable of cross-linking the cellulose.

The results below also show that although the acylation proceeds fairly rapidly at higher temperatures, it may also be accomplished at much reduced temperatures for longer periods of time.

EXAMPLE 25

Single-ply cotton yarn was selected of such a size that a 15,540 yard length of it weighed a pound. It was purified by extraction with ethanol and by scouring with an aqueous solution of sodium hydroxide (2%), and it was dried for 16 hours at 50° C. in vacuo (under 1 torr). Accurately weighed samples, each approximately 4.7 grams, were kept for 20 hours in dimethylformamide (5 ml. per gram of cotton) in order to pre-swell them. Then benzoic ethylcarbonic anhydride (1 to 4 grams per gram of cotton) was added to each of three samples (25a, 25b, 25c) in the amounts set forth in Table 16 below. The benzoylation of the cellulose was carried out at 114 ± 4° C. for 1.25 ± 0.25 hours. The treated yarn was washed with methanol, and oven-dried. The degree of substitution of cellulosic hydroxyl by benzoyl, i.e., the degree of esterification or benzoylation, was calculated from the weight gain on a bone-dry basis. Results are given in Table 16.

TABLE 14

| Sample | Adipic bis(ethylcarbonic anhydride), percent, in dimethylformamide | | | Conditions for esterification | Corrected weight gain, percent | Extant utilization of padded reagent, percent | Crease recovery, degress | |
|---|---|---|---|---|---|---|---|---|
| | OWB | WPU | OWF | | | | Dry | Wet |
| 23a | 25 | 91 | 22.3 | 24 hrs. at 22° C | 0.4 | 5 | | |
| 23b | 25 | 88 | 22.0 | 4 hrs. at 90° C | 1.4 | 17 | | |
| 23c | 25 | 101 | 25.3 | 0.25 hr. at 135° C | 6.3 | 66 | 246 | 228 |
| 23d | 25 | 93 | 23.3 | 0.5 hr. at 135° C | 5.5 | 62 | 248 | 222 |

TABLE 16

| Sample | Grams of benzoic ethylcarbonic anhydride per gram of cotton | Weight gain, percent | Degree of substitution by benzoyl | Extent utilization of reagent, percent |
| --- | --- | --- | --- | --- |
| 25a | 1 | 9.3 | 0.144 | 17.3 |
| 25b | 2 | 12.0 | 0.186 | 10.8 |
| 25c | 4 | 12.8 | 0.200 | 6.0 |

Variations were carried out which showed that the degree of substitution by benzoyl was not substantially affected by (a) varying the dimethylformamide-to-cotton ratio (from 3 to 12 ml. of dimethylformamide per gram of cotton), (b) pre-swelling time, or (c) increasing the reaction temperature to 150° C.

Products having degrees of substitution in excess of 0.2 were prepared by successive benzoylations by means of benzoic ethylcarbonic anhydride following removal of by-products at each stage. A sample given 8 successive benzoylations had a final degree of substitution of 0.99.

EXAMPLE 26

A sample of 80 × 80 cotton print cloth was conditioned and weighed as in Example 11. It was padded with a 20% solution of ethylcarbonic (polystyrene) carboxylic anhydride (the product of Example 8) in dimethylformamide so the wet pick-up was 91 percent. The sample was dried at 50° C., then cured for 0.25 hour at 135° C. Next it was rinsed in toluene, in dimethylformamide, and finally in a 0.1 percent aqueous solution of the nonionic detergent used in Example 11. Despite the action of the strong solvents and detergent, a permanent weight gain of 1.12 percent persisted, indicating that esterification had occurred.

EXAMPLE 27

Six samples of 80 × 80 cotton print cloth (27a–27f) were conditioned and weighed as in Example 11. They were padded with 10 or 20 percent solutions of ethylcarbonic 11-[fluorobis(trifluoro-methyl)methoxy]undecanoic anhydride ($C_{17}H_{25}F_7O_5$, the product of Example 9) in dimethylformamide, dried at approximately 38° C., and cured at various times and temperatures in accordance with data tabulated below in Table 17, to form 11-[fluorobis(trifluoromethyl)methoxy]undecanoic esters of cellulose. After the esterification reaction, each sample was rinsed in dimethylformamide and in water.

Results of measurements of the several samples are tabulated below in Table 17.

Examination of sample 27a showed it had a bound-fluorine content of 2.98 percent. Sample of 27a was thereafter exposed to 0.5 normal sodium hydroxide for 3 hours at room temperature, with the result that a weight loss of 1.94 percent occurred. The loss of reagent was 29 percent from alkaline hydrolysis, and the resulting fabric sample was found to have a fluorine content of 2.00 percent.

EXAMPLE 28

A sample of 80 × 80 cotton print cloth was conditioned and weighed as in Example 11. It was padded with a 20 percent solution of ethylenebis[carbonic 4-[fluorobis(trifluoromethyl)methoxy]-butyric anhydride] ($C_{18}H_{16}F_{14}O_{10}$, the product of Example 10) in dimethylformamide so the wet pick-up was 94 percent. The sample was cured for 0.25 hour at approximately 163° C. Next it was rinsed in dimethylformamide, then in a 0.1 percent aqueous solution of the nonionic detergent used in Example 11. When dry, the weight gain was found to be 2.5 percent, indicating that the efficiency in the utilization of the anhydride reagent in the formation of esterified cellulose had been 17 percent. The bound-fluorine content of the fabric sample was 1.31 percent.

From the above description and representative examples of the present invention, it is seen that the carbonic carboxylic anhydrides esterify high molecular weight polyols, such as cellulose, effectively under mild, practically neutral, conditions. No catalysts are needed, and heating is minimal compared with prior practices for esterifying cellulose and the like. The process does not involve fixed acids or strong acids, and such acids are neither needed nor produced. Consequently, undesirable side effects are greatly minimized, notably depolymerization, degradation, and hydrolytic cleavage. Accordingly, the present process permits the ready preparation of valuable esters of cellulose yet avoids much of the damage to the substrate formerly connected with the modification of hydroxylated polymers by esterification.

It is understood that the above description of my invention is exemplary, and that modifications could readily be suggested by those skilled in the art to the specific processes described without departing from the spirit of the invention.

What I claim is:

1. A compound having the formula:

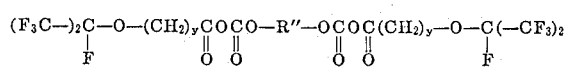

wherein y is an integer of from 1 to 12 and R'' is a lower alkaline group having from one to 12 carbon atoms.

2. A compound having the formula:

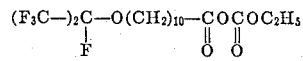

* * * * *

TABLE 17

| Sample | Anhydride reagent ($C_{17}H_{25}F_7O_5$), percent from, dimethylformamide | | | Conditions for esterification | Weight gain found, percent | Extent utilization of reagent, percent | Tensile strength, lbs. |
| --- | --- | --- | --- | --- | --- | --- | --- |
| | OWB | WPU | OWF | | | | |
| 27a | 20 | 94 | 18.8 | 0.25 hr. at 135° C | 7.12 | 48 | 53 |
| 27b | 20 | 94 | 18.8 | 0.5 hr. at 135° C | 7.68 | 51 | 52 |
| 27c | 20 | 94 | 18.8 | 0.25 hr. at 163° C | 7.64 | 51 | 52 |
| 27d | 10 | 91 | 9.1 | 0.25 hr. at 135° C | 4.30 | 59 | 55 |
| 27e | 10 | 91 | 9.1 | 0.5 hr. at 135° C | 4.46 | 62 | 52 |
| 27f | 10 | 91 | 9.1 | 0.25 hr. at 163° C | 4.76 | 66 | 54 |